Sept. 25, 1934.　　　　G. P. ORDE　　　　1,975,017
OPTICAL PROJECTION APPARATUS
Filed April 17, 1933　　　3 Sheets-Sheet 1

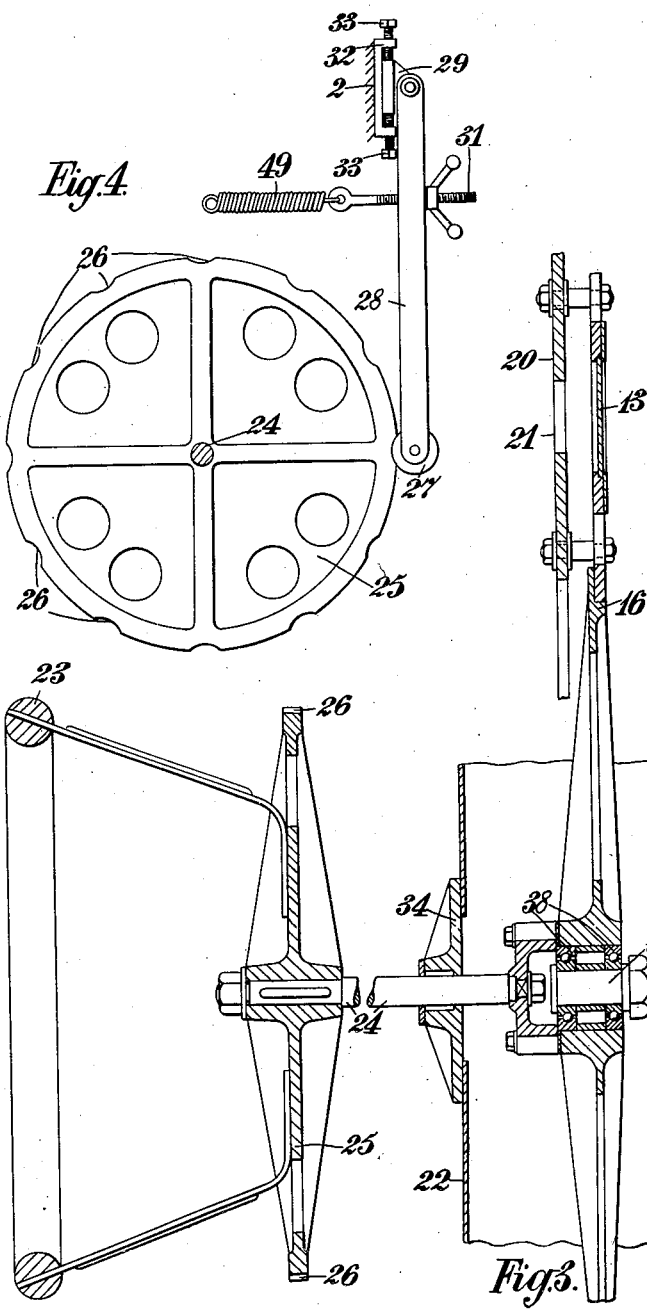

Patented Sept. 25, 1934

1,975,017

UNITED STATES PATENT OFFICE 1,975,017

OPTICAL PROJECTION APPARATUS

Godfrey Philip Orde, London, England, assignor, by direct and mesne assignments, of one-tenth to Sky Publicity Limited, London, England, and nine-tenths to William Francis Egginton Briggs, London, England Application April 17, 1933, Serial No. 666,596
In Great Britain October 11, 1932

5 Claims. (Cl. 88—27)

The invention relates to optical projection apparatus suitable for the projection of "objects" on to clouds for advertising or other purposes.

The kind of apparatus to which the present invention relates, comprises according to one form, an elliptical mirror with a source of light, such as an electric arc, in the proximate focus, and a representation or reproduction of the object to be projected disposed in the conjugate focus.

The beam of light reflected from the mirror, after traversing the object, then passes through a suitable projector lens system. Apparatus of the kind in question, when used for projecting objects on the clouds is of considerable length and, owing to the large angle it makes with the horizontal when in use, the "object" to be projected is not readily accessible.

A main object of the present invention is to overcome difficulties connected with the exposure of different "objects" without constantly bringing the projector down to the horizontal position.

With such a main object the invention consists in optical projection apparatus and certain components thereof comprising the features hereinafter described and particularly pointed out in the claims.

Referring to the accompanying drawings, which are in part of a diagrammatic nature:—

Figure 4 is a view suitably enlarged of the registering wheel shown in Figure 1.

The same reference symbols are used to denote corresponding parts in the different figures.

Figure 1:
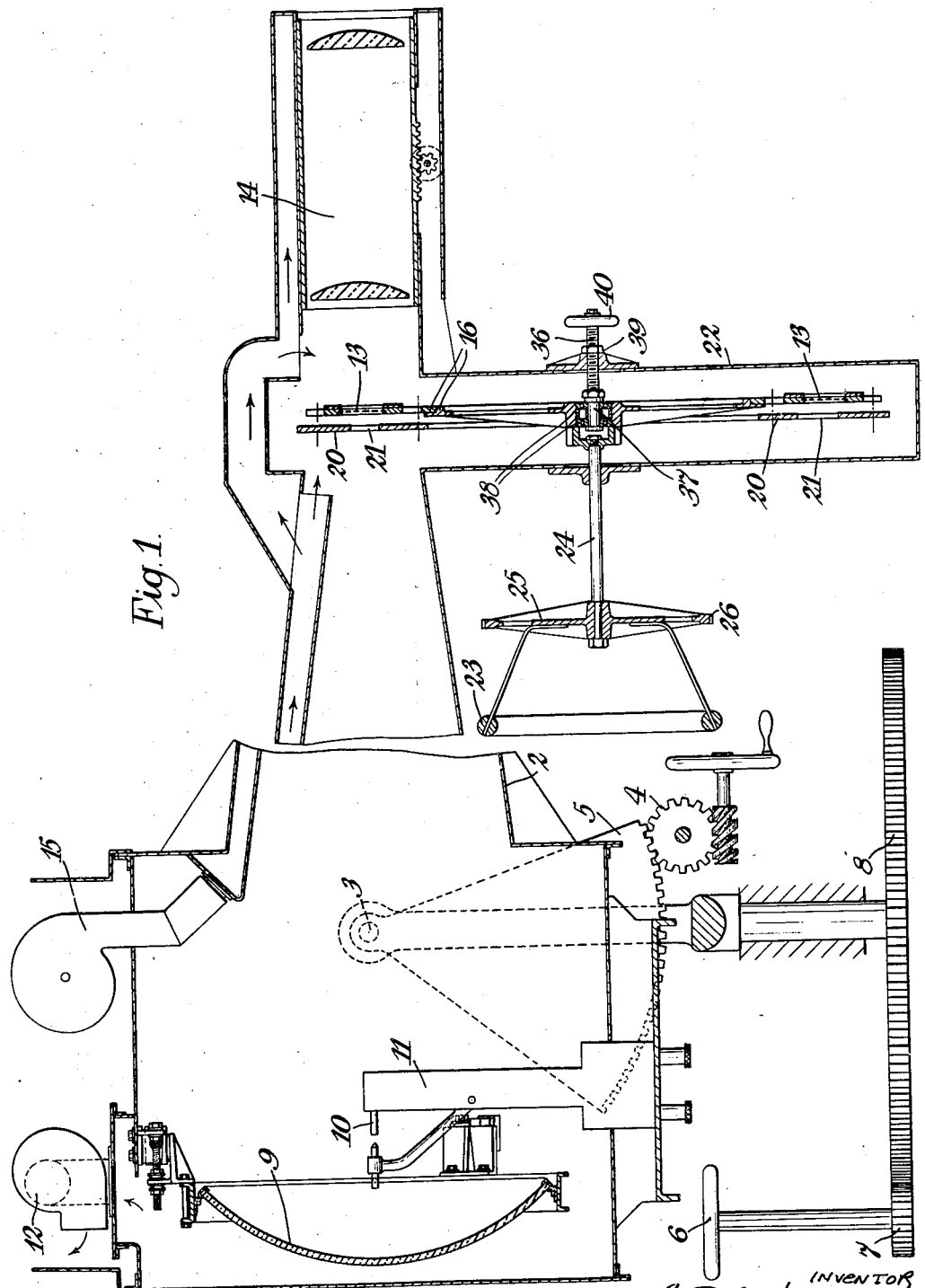
Figure 1 shows a sectional elevation through one form of projector as a whole.
Figure 2:
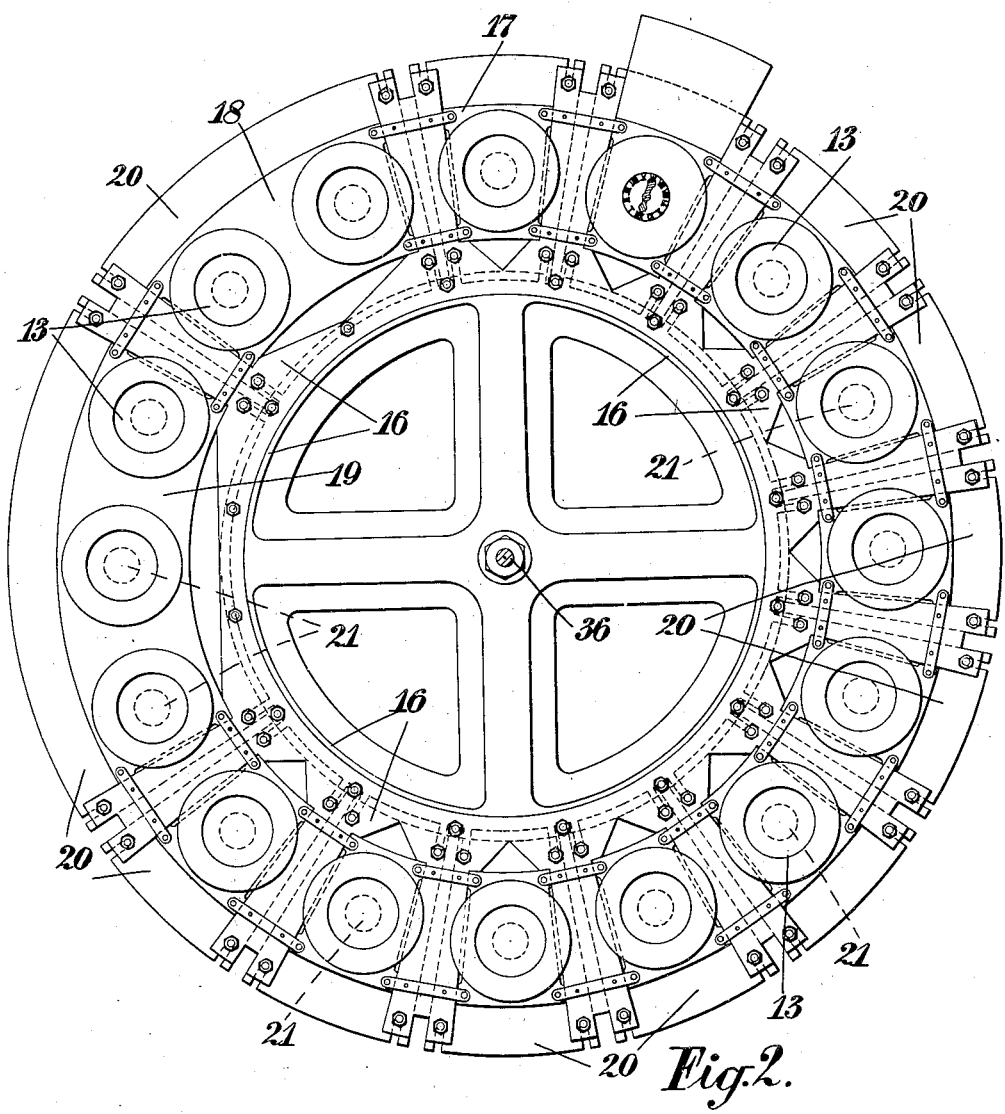
Figure 2 is a view to an enlarged scale looking on the object carrier in an axial direction, Figure 3 being a corresponding sectional elevation; while finally

The general features of one form of projector, suitable for sky projection, to which the present invention is applicable, comprise (see Figure 1) an elongated casing, 2, mounted on trunnions, 3, about which it can be turned to different altitudes by a gear wheel, 4, meshing with a toothed sector 5. The projector can also be moved in azimuth by help of the hand-wheel, 6, actuating the toothed pinion, 7, gearing with the fixed gear wheel 8.

The projector is provided with an ellipsoidal mirror, 9, in the proximate focus of which the crater carbon, 10, of an arc lamp, 11, is arranged, products of combustion from the arc being withdrawn from the casing by means of a suction fan, 12.

The object, 13, to be projected, and in some cases made of or depicted on quartz or other refractory material, is arranged in the conjugate focus of the mirror, whence the rays of light pass on through the adjustable lens system, 14.

Since heat in addition to light is concentrated at the focus, the object, 13, and lens system, 14, may be cooled, if desired, by air from a fan, 15, driven for example by an electric motor.

According to one form of the present invention, the object carrier consists of a circular plate, frame or the like, 16, large enough to accommodate, say, sixteen such objects in the form perhaps of stencils, detachably arranged round its periphery; these stencils may be arranged individually as at 17 or in groups of two as at 18 or of three as at 19 to form multiple units for insertion in the carrier.

The frame, 16, also carries a number of screens, 20, e. g., of carborundum, spaced to correspond with the objects and each provided with a circular or other aperture, 21, to define the area of the object illuminated.

The object carrier, 16, is mounted rotatably to turn about an axis parallel to the optical axis of the projection apparatus, and is enclosed in a circular casing, 22, attached to the main casing, 2, of the projector, the distance of the objects individually from the centre of rotation of the carrier being equal to the distance of the axis of the carrier from the optical axis of the projector. A hand wheel, 23, is mounted on the carrier spindle, 24, which is of such a length that it can be readily operated without lowering the apparatus to the horizontal position.

In order to provide for registration of a given stencil in the right position, (see Figure 4) a disc, 25, having sixteen (to correspond with the number of objects) circular notches, 26, spaced round its periphery is mounted on the carrier spindle, 24, preferably near the hand wheel, 23. Co-acting with these notches, 26, is a stop comprising a roller, 27, carried on one end of a lever 28, pivotally mounted at the other end to the element, 29, the roller, 27, being held up against the disc, 25, by a spring, 49, and tightening screw, 31, associated with the lever, 28. At the same time, the element, 29, is carried in a frame or the like, 32, attached to the main casing, 2, in such a way that its position can be adjusted by a screw device, 33, thereby adjusting the operative position of the stop or roller, 27, and securing an exact registration of the objects in relation to the beam of light from the mirror, 9.

After such an adjustment has once been made, it will be seen that by mere operation of the hand-wheel, 23, successive objects in the carrier, 16, can be readily brought into correct position by help of the spaced notches, 26, around the disc, 25.

In general, it is necessary to provide for a bodily axial movement of the carrier, 16, for bringing the objects into the exact focus of the mirror, 9, and in such a case, an arrangement of the following kind (see Figure 3) may be provided.

The carrier itself, 16, is overhung on the operating spindle, 24, above described, which passes through suitable bearings, 34, in one wall of the carrier casing, 22, while through a suitable fitting, 35, on the other wall passes a screwed spindle, 36, of short length having a journal, 37, on which the overhung boss of the carrier runs in ball bearings, 38, the screwed spindle, 36, being provided with a lock-nut, 39, and hand-wheel, 40, outside the casing, 22. In order to bring the objects into precise focus, the lock-nut, 39, is slacked back and the hand-wheel, 40, turned so as by axial movement of the carrier, 16, to bring the objects mounted thereon into focus. On tightening the lock-nut, 39, the desired focal position is maintained without interference with the action of the devices above described for bringing successive stencils into position for projection.

Although one form of object carrier with a preferable system of adjustments has been described in some detail in order to explain the general nature of the invention, it will be understood that the constructional components may take many different forms without exceeding the ambit of the invention as defined in the claims appendant hereto.

Having now described my invention, what I claim as new and desire to secure by Letters Patent is:—

1. In optical apparatus suitable for projecting objects on clouds, the combination of a framework and mounted thereon a source of light, a mirror to throw said light on the object to be projected, a rotatably-mounted object carrier having accommodation thereon for a plurality of objects, a resiliently-controlled stop for locating said objects in the projecting position, and means for adjusting the operative position of said stop.

2. In optical apparatus suitable for projecting objects on clouds, the combination of a framework and mounted thereon an ellipsoidal mirror, a source of light disposed in the proximate focus of said mirror, rays of light from said source being brought to a focus in the conjugate focus, a movably-mounted object carrier having accommodation thereon for a plurality of objects, means for moving said carrier in a certain direction to bring a given object to the projecting position and means independent of said moving means for moving said carrier in a different direction to focus said objects thereon in said conjugate focus.

3. In optical apparatus suitable for projecting objects on clouds, the combination of a projector framework and mounted thereon a source of light, a mirror to throw said light on the object disposed in the optical axis of said projector, an object carrier rotatable on said framework about an axis parallel to said optical axis and having accommodation thereon for a plurality of objects at equal distances from said axis of rotation of said carrier, a resiliently-controlled stop for locating said objects in the projecting position and means for adjusting the operative position of said stop.

4. In optical apparatus suitable for projecting objects on clouds, the combination of a projector framework and mounted thereon an ellipsoidal mirror, a source of light disposed in the proximate focus of said mirror, rays of light from said source being brought to a focus in the conjugate focus, the straight line through said two foci defining the optical axis of said projector, an object carrier rotatable on said framework about an axis parallel to said optical axis and having accommodation thereon for a plurality of objects located on said carrier at distances from the axis thereof equal to the distance between said axis and said optical axis, means for rotating said carrier to given projecting positions and means independent of said rotating means for moving said carrier bodily in the axial direction thereof to focus said objects thereon in said conjugate focus.

5. An object carrier for use in optical apparatus suitable for projecting objects on clouds, having accommodation thereon for a plurality of objects and including heat-resisting screening means disposed on that side of said objects disposed towards the source of projecting light, said screening means having apertures therein registering respectively with said objects to determine the area thereof illuminated and to screen other areas.

GODFREY PHILIP ORDE.